(12) United States Patent
Lapuyade et al.

(10) Patent No.: US 7,219,109 B1
(45) Date of Patent: May 15, 2007

(54) TIME ZONE MANAGEMENT

(75) Inventors: Eric Lapuyade, Clapiers (FR); Regis Nicolas, Jacou (FR); Jeff Parrish, Lattes (FR)

(73) Assignee: PalmSource, Inc., Sunnyvale, CA (US)

( * ) Notice: Subject to any disclaimer, the term of this patent is extended or adjusted under 35 U.S.C. 154(b) by 248 days.

(21) Appl. No.: 09/940,321

(22) Filed: Aug. 27, 2001

(51) Int. Cl.
*G06F 17/30* (2006.01)
(52) U.S. Cl. ..................................... 707/200
(58) Field of Classification Search ................ 707/200, 707/1, 2, 10, 5; 705/37, 8; 709/217; 368/21
See application file for complete search history.

(56) References Cited

U.S. PATENT DOCUMENTS

| | | | | |
|---|---|---|---|---|
| 5,845,257 | A * | 12/1998 | Fu et al. ........................ | 705/8 |
| 6,198,696 | B1 * | 3/2001 | Korpi et al. ................... | 368/21 |
| 6,631,402 | B1 * | 10/2003 | Devine et al. .............. | 709/217 |
| 2002/0116541 | A1 * | 8/2002 | Parker et al. ............... | 709/318 |
| 2003/0009411 | A1 * | 1/2003 | Ram et al. ..................... | 705/37 |

* cited by examiner

*Primary Examiner*—Etienne P LeRoux
(74) *Attorney, Agent, or Firm*—Berry & Associates P.C.

(57) ABSTRACT

A time zone management system and method for a datebook like application. A user can associate a time zone with an event or appointment, especially on a palmtop computer. The event can be associated with the time zone by selecting the time zone as an attribute from a details menu, or other suitable user interface mechanism or other mechanism. The user can select a display time zone, and all events to be displayed are translated to the display time zone to be displayed on the palmtop computer.

18 Claims, 9 Drawing Sheets

800

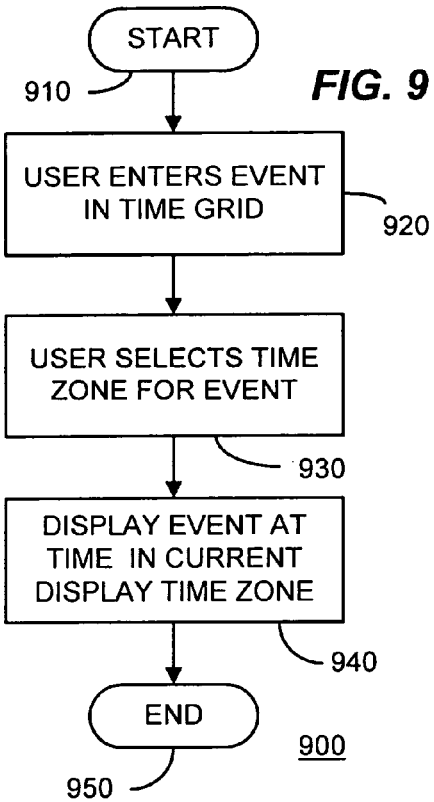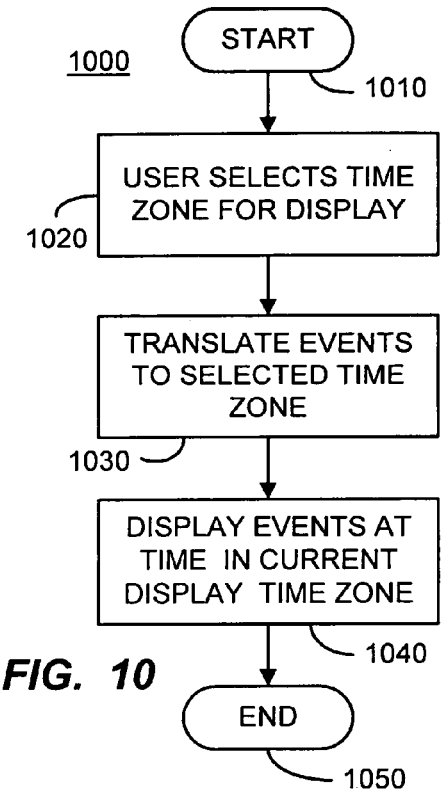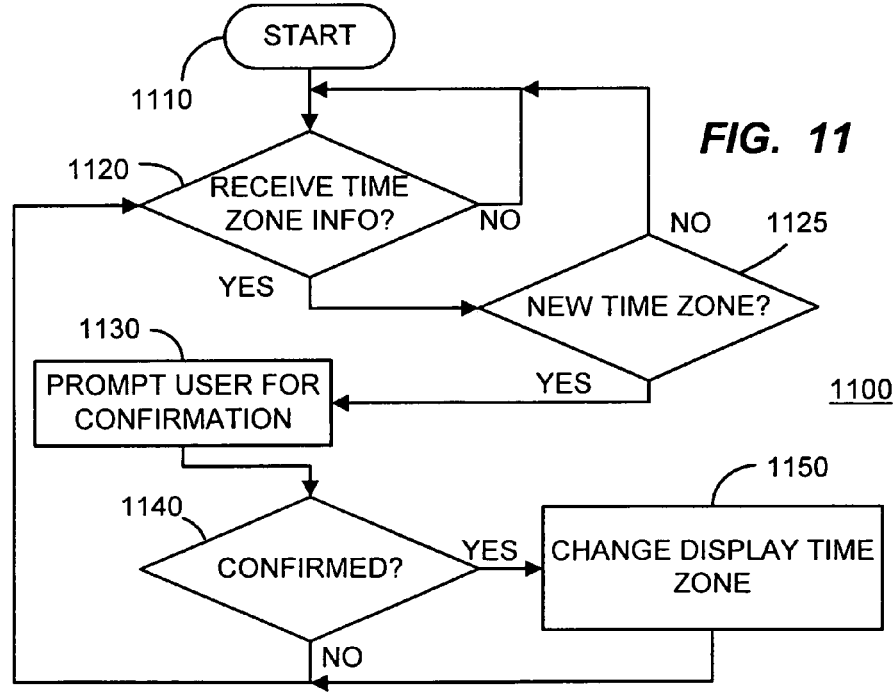

TIME ZONE MANAGEMENT

FIELD OF THE INVENTION

This invention relates generally to the field of computer programs implementing date-book like applications. More particularly, this invention relates to a time zone management method and apparatus particularly suitable for a palmtop computer.

BACKGROUND OF THE INVENTION

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer (i.e., a date-book like application) and electronic notepads, to name a few.

Among the most popular features of such palmtop computers is the daily organizer which operates on the palmtop computer and synchronizes to a similar application on a user's desktop computer. Such applications of the palmtop computer have made managing appointments and events easier and more convenient for many users. However, rapid advances in communication and travel have caused many people to commonly have dealings with associates all over the world. This makes management of an event calendar more challenging due to the need to operate across multiple time zones. Heretofore, the date-book functions of computer applications in general including palmtop computers has been inadequate to deal with the problems associated with maintaining a calendar of events occurring in multiple time zones.

Consider for example the following situations:

1. You are in France and schedule an appointment for a phone call with someone in California. You both want to deal with the same time and time zone to create the appointment, but still see at what time this will translate in your own local time zone.

2. You are in France and schedule an appointment for a phone call with someone in California while you will be in Tokyo (or maybe you don't even know where you will be at the appointment time). You want to use the California time to set the appointment, and see it displayed in your local time, even if you have changed time zone since you set it.

3. You are in France, and schedule a meeting with someone in California, but this meeting will take place in Tokyo. You both want to be able to use Tokyo time.

SUMMARY OF THE INVENTION

The present invention relates generally to methods and apparatus for time zone management, particularly with palmtop computers. Objects, advantages and features of the invention will become apparent to those skilled in the art upon consideration of the following detailed description of the invention.

In one embodiment of the present invention, a time zone management system and method for a date-book like application lets a user associate a time zone with an event or appointment, especially on a palmtop computer. The event can be associated with the time zone by selecting the time zone as an attribute from a details menu, or other suitable user interface mechanism or other mechanism. The user can select a display time zone, and all events to be displayed are translated to the display time zone to be displayed on the palmtop computer. This provides many advantages including simplifying the use of the palmtop computer across time zones so that events can be entered directly in a particular remote time zone, but displayed in another time zone of the user's choosing.

In one embodiment consistent with the present invention, a method of management of time zone information in a calendar application, includes storing an event associated with a block of time; storing a time zone attribute associated with the event; establishing a display time zone for display of events; translating the block of time associated with the event from the stored time zone to the display time zone; and displaying the event as occurring at the translated block of time.

A palmtop computer having time zone information management, consistent with certain embodiments of the present invention has a programmed processor and a display. A calendar application runs on the programmed processor to store an event associated with a block of time, the calendar application further operating to: store an event time zone attribute associated with the event; store a display time zone for display of events; translate the block of time associated with the event from the stored time zone to the display time zone; and means for displaying the event as occurring at the translated block of time on the display.

A palmtop computer having time zone information management, consistent with an embodiment of the present invention has a programmed processor, a display and a user interface. A calendar application runs on the programmed processor to store an event associated with a block of time, the calendar application further operating to: store an event time zone attribute associated with the event; store a display time zone for display of events; translate the block of time associated with the event from the stored time zone to the display time zone; displaying the event as occurring at the translated block of time in a daily time grid on the display; wherein the display time zone is established by a user selection from a display time zone user interface element forming part of the user interface; wherein the event time zone is established by a user selection from an event time zone user interface element forming part of the user interface.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 9 is a flow chart depicting association of a time zone with an event consistent with certain embodiments of the present invention.

FIG. 10 is a flow chart depicting selection of a display time zone consistent with certain embodiments of the present invention.

FIG. 11 is a flow chart depicting semiautomatic time zone changes consistent with certain embodiments of the present invention.

DETAILED DESCRIPTION OF THE INVENTION

Figure 1:
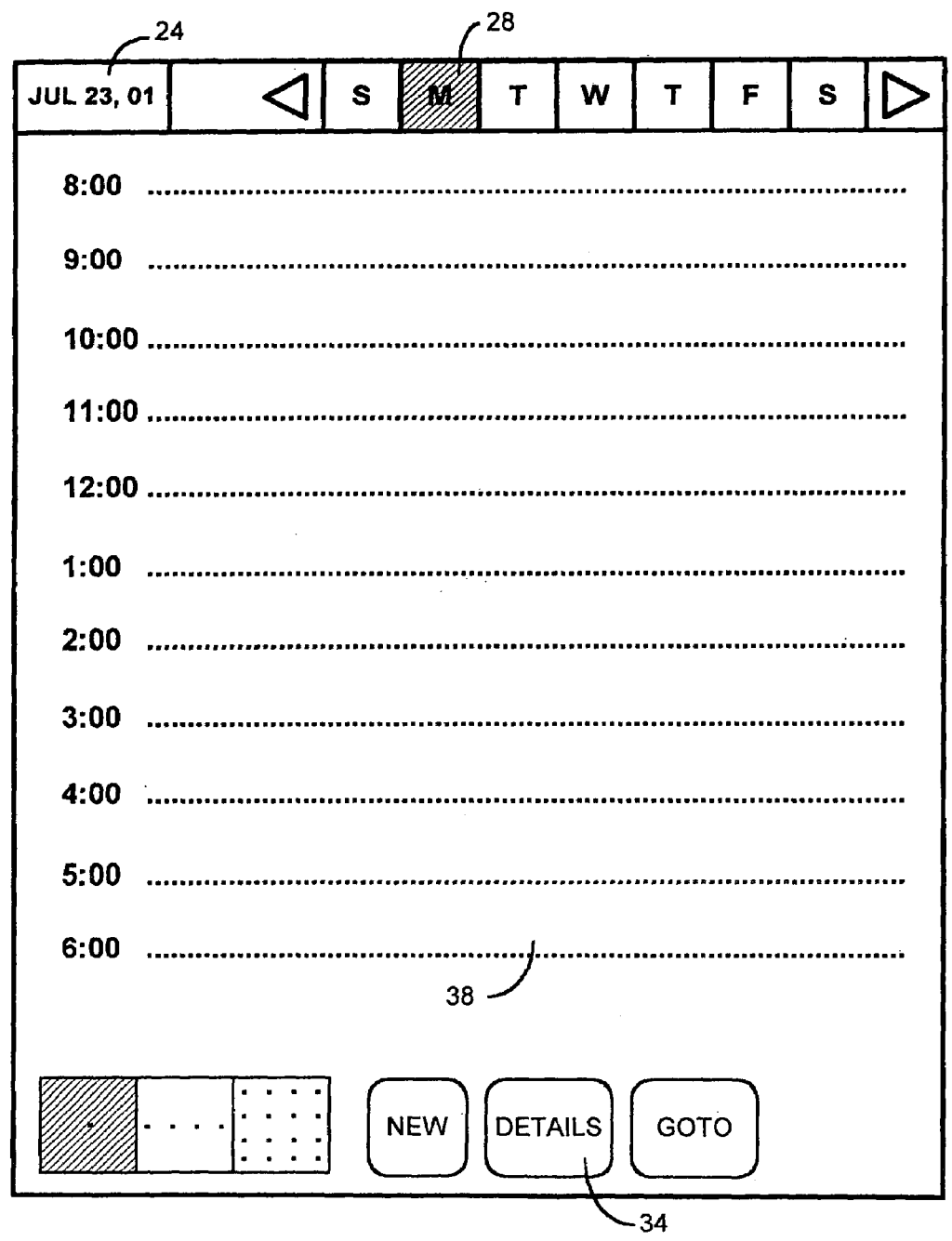
FIG. 1 is an exemplary display of a daily view of a date-book like event manager.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be born in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "selecting" or "translating" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Time Zone Management in Accordance with the Invention

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Turning now to FIG. 1, an exemplary date-book display 20 showing a daily view (contrasted to a weekly or monthly view) for a selected date such as that which appears in version 3.0 the Palm Operating System by Palm Computing, Inc, Santa Clara, Calif. The date is shown in block 24 and the day of the week is shown in block 28. The time blocks in the day are illustrated as a grid having an array of entries adjacent time blocks in a manner similar to that used in conventional paper date books. In one embodiment, such as that implemented in version 3.0 of the Palm Operating System from Palm Computing, Inc., the user enters dates directly into the date-book application by selecting a time (by tapping the space to the right of the time using a stylus on a touch sensitive touch-screen that serves as a display and input device) and entering a notation adjacent the time using a form of writing designed for handwriting recognition called the "Graffiti®" alphabet (Graffiti is a registered trademark of Palm Computing, Inc.). Text then appears adjacent the selected time. The time can be refined and other attributes added by selection of "details" button 34 (by tapping the button with the stylus). Thus, to enter an appointment or event starting at 6:00 pm, the user taps the space 38 adjacent the 6:00 pm indication and then enters the event in a special area of the device designated for data entry.

FIGS. 2–7 generally illustrate an exemplary user interface with various user interface elements including menus, windows, icons, buttons, data entry boxes, etc. that provide the user with the ability to enter data and make selections consistent with embodiments of the present invention. Those skilled in the art will appreciate that there are many ways to provide user interfaces and the exact user interface described herein should not be considered limiting to the scope of the invention, but should be considered as an illustrative example.

Figure 2:
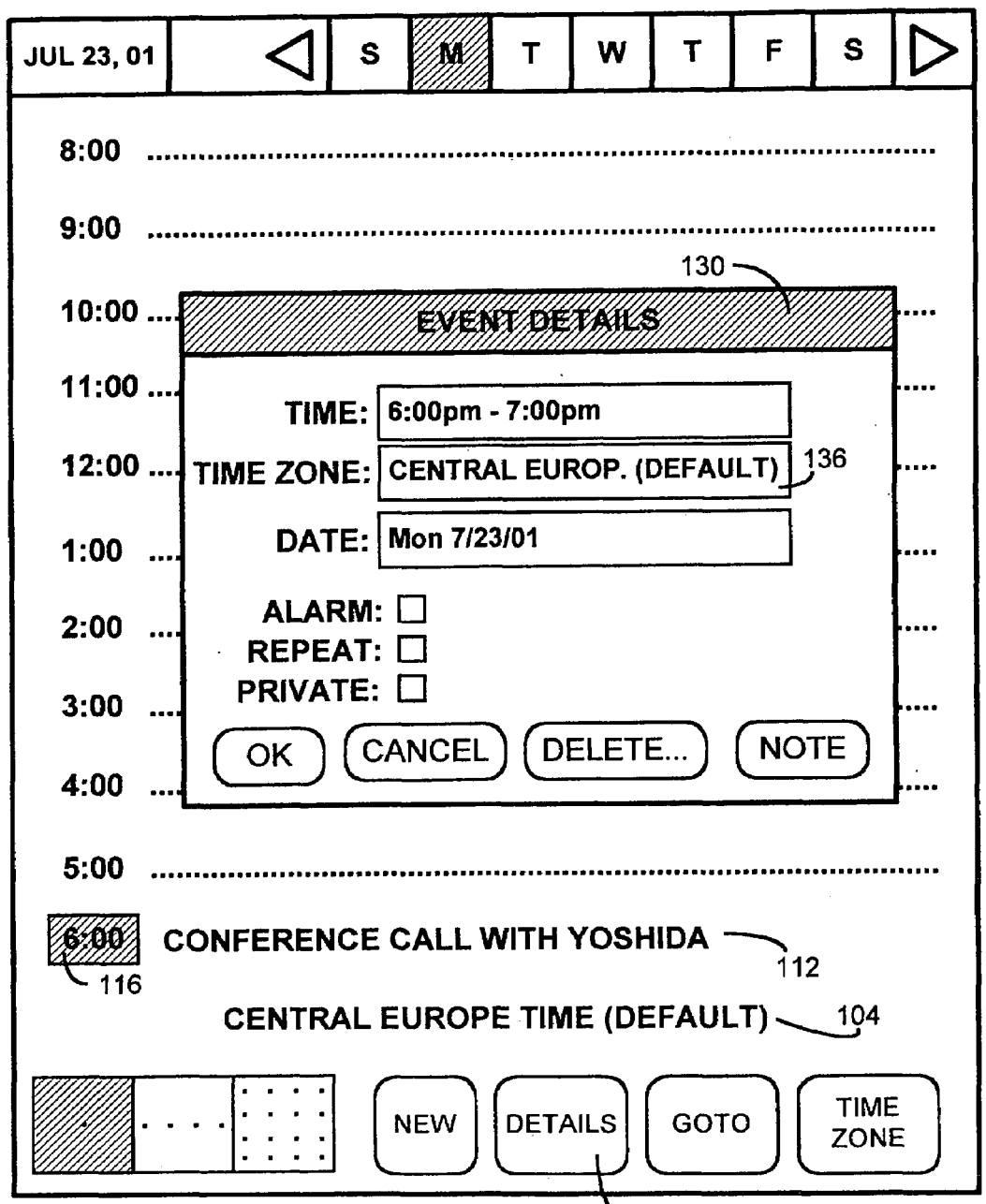
FIG. 2 is an exemplary display illustrating an extension of the event manager that permits association of a time zone with an event consistent with an embodiment of the present invention.

FIG. 2 illustrates an extension of the above event management mechanism to account for events occurring in various time zones. In this illustration, display 100 incorporates features similar to that of display 20 and in general, the palmtop computer implementing the present invention can carry out any or all of the function of the currently available palmtop computers, such as the Palm VII™ palmtop computer and others available from Palm Computing, Inc. Display 100 also includes an indicator 104 of the currently displayed time zone. Of course, those skilled in the art will appreciate that the current display time zone (the time zone associated with the current date-book application display—referred to herein as the display time zone) can be indicated in other manners than that shown.

In one exemplary embodiment, in order to enter an appointment or event, the user taps the space adjacent the desired time and then enters the event in a special area of the device designated for data entry. In the example shown, an event 112 identified as "CONFERENCE CALL WITH YOSHIDA" has been entered and stored in association with a time block starting at 6:00 pm and ending at 7:00 pm. This event is still selected as indicated by the shading of the "6:00" time indicator 116. In order to alter the time zone or make other entries associated with the date and time, the user can select the "details" button 120 (by tapping the button with a stylus) to bring up an "EVENT DETAILS" menu 130. This menu can be used in a conventional manner to add notes, alarms or other attributes to the event. In accordance with one embodiment of the present invention, this menu can also be used to change the time zone associated with the event (the event time zone). The user can select a default time zone as a device preference to prevent the need to enter an event time zone unless it deviates from the default time zone. This default time zone appears in block 136 and will be associated with an event unless specifically changed by the user.

Figure 3:
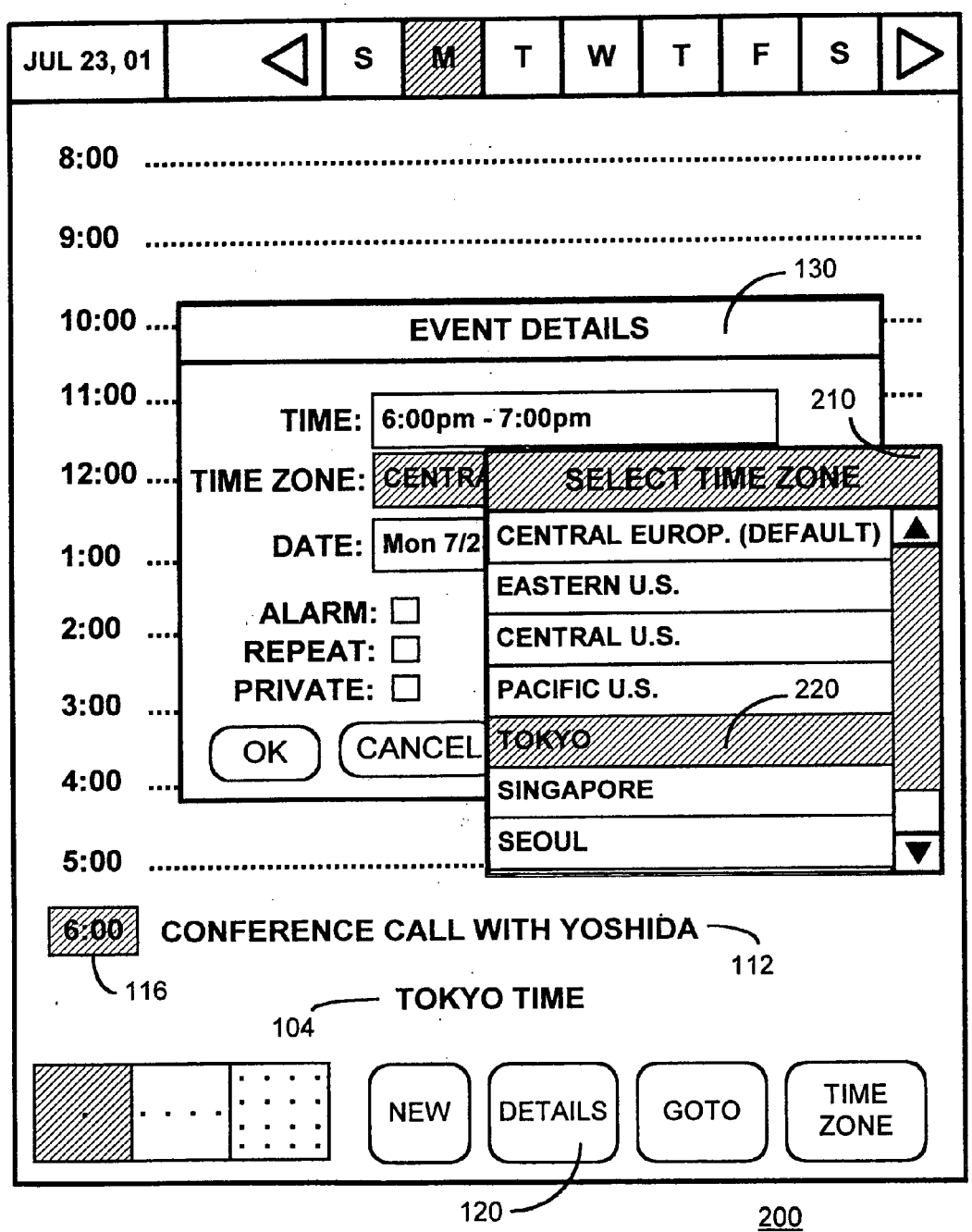
FIG. 3 is an exemplary display illustrating selection of a time zone for an event consistent with an embodiment of the present invention.
Figure 4:
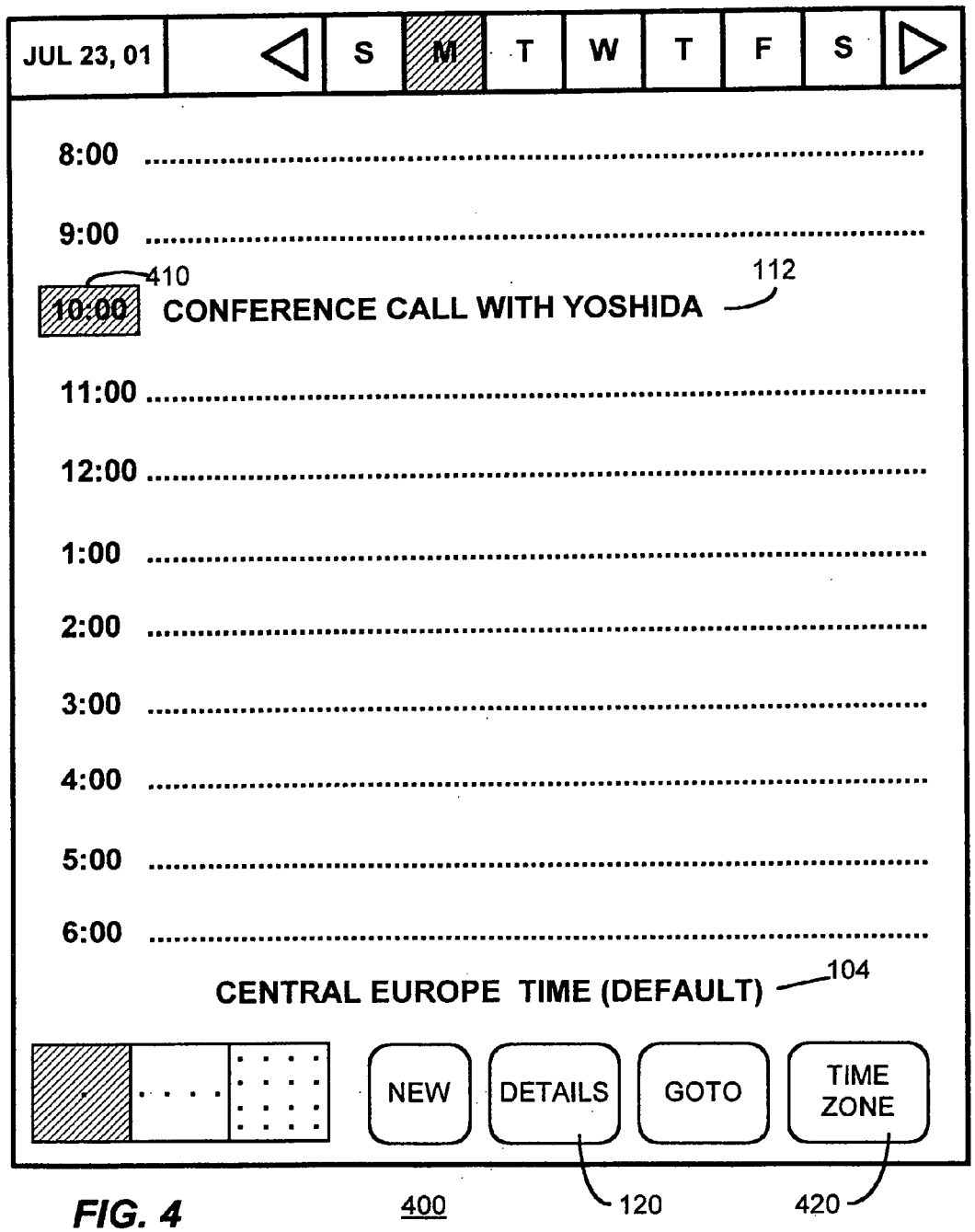
FIG. 4 is an exemplary display showing an event that is translated to a default time zone consistent with an embodiment of the present invention.
Figure 5:
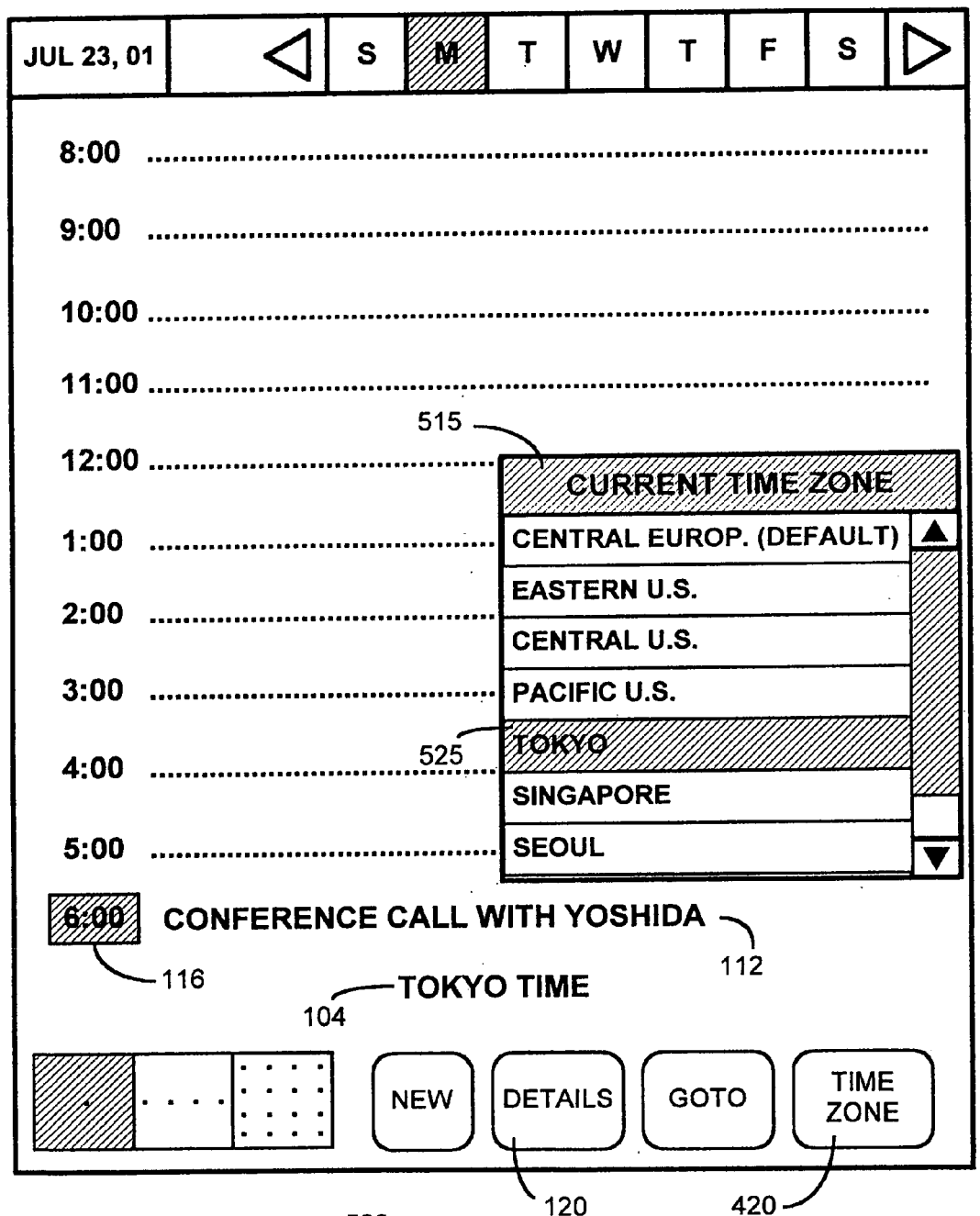
FIG. 5 is an exemplary display showing selection of a display time zone in an embodiment consistent with the present invention.
Figure 6:
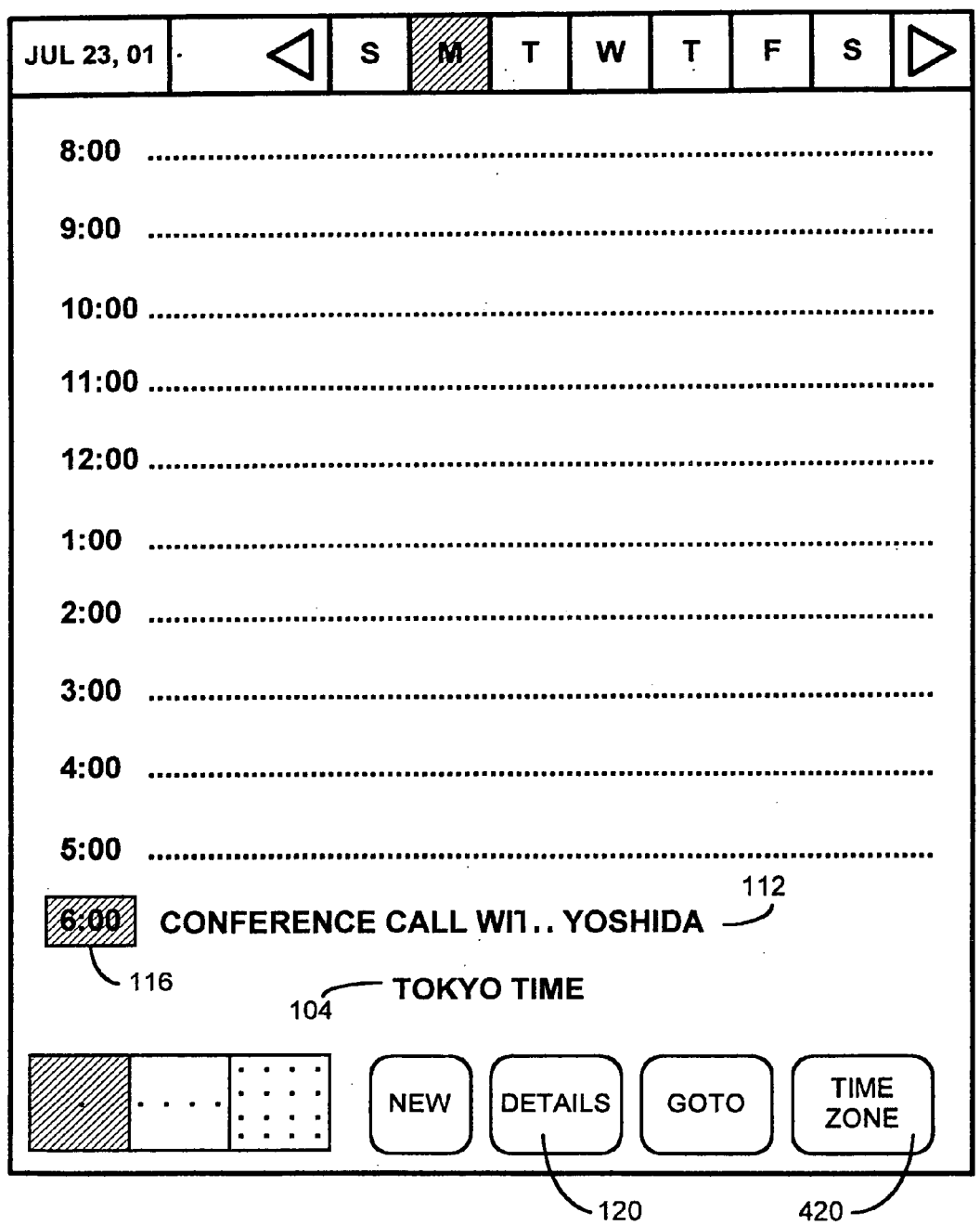
FIG. 6 is an exemplary display showing an event in a selected display time zone in an embodiment consistent with the present invention.

In order to change the time zone associated with the currently selected event, the user selects the "TIME ZONE" block 136 in the EVENT DETAILS menu (again, by tapping the block with a stylus) to bring up a list of time zones in a "SELECT TIME ZONE" menu 210 as illustrated in display 200 of FIG. 3. The user can then select a time zone to be associated with the event. In this illustrative example, the Tokyo time zone is selected as indicated by shading of box 220. In one embodiment, selection of that event time zone will then cause the selected time zone to be temporarily reflected in the time zone display 104, but this is not to be limiting, since the display time zone is managed in a separate manner as will become apparent later. The list of time zones in menu 210 may be a default list containing all possible world time zones in one embodiment. In another embodiment, the menu may contain only the most recently used time zones. In yet another embodiment, the user can select an array of time zones to be displayed during a setup procedure. Other variations are also possible within the scope of the present invention.

Once a time zone has been associated with the event as described above or using any suitable alternative for making such an association, it is saved as an attribute associated with the event. The user can display appointments and other events in any display time zone and the appointment (event) times are translated from the stored event time zone to the display time zone. This is illustrated in display 400 of FIG. 4, wherein the display time zone is the default time zone, which in this illustrative example is Central European Time as shown in area 104. Displayed in Central European Time, the event 112 is shifted in time by eight hours to 10:00 am as shown 410 so that the event can be readily understood and coordinated with other events in the local time.

If the user wishes to change to another display time zone, the user can select the time zone button 420 to bring up a "CURRENT TIME ZONE" menu 515. The user can then adjust the display time zone as desired. In this example, the current time zone (the display time zone) can be changed to Tokyo time by selecting the TOKYO block 525 from menu 515. This causes the display 500 to indicate Tokyo time at 104 and shift the event 112 to 6:00 pm as illustrated in display 600 of FIG. 6. Those skilled in the art will appreciate that other events might also be scheduled in a particular day and those events would similarly shift with selection of a new time zone. In generally, the user can select a default time zone to prevent the need to enter either a display or an event time zone unless it deviates from the default time zone.

Time zones are commonly associated with a number of hours difference (plus or minus) from Greenwich Mean Time (GMT). Thus, in order to translate between two time zones, the difference between the two time zones and GMT can simply be subtracted. For example, Tokyo time is GMT+9 hours while Eastern U.S. Standard Time is GMT−5 hours. Thus, to translate a time between these two time zones, one simply subtracts so the difference is 14 hours. In many cases, the date might also require correction in any time zone translation and should be reflected in block 24.

Figure 7:
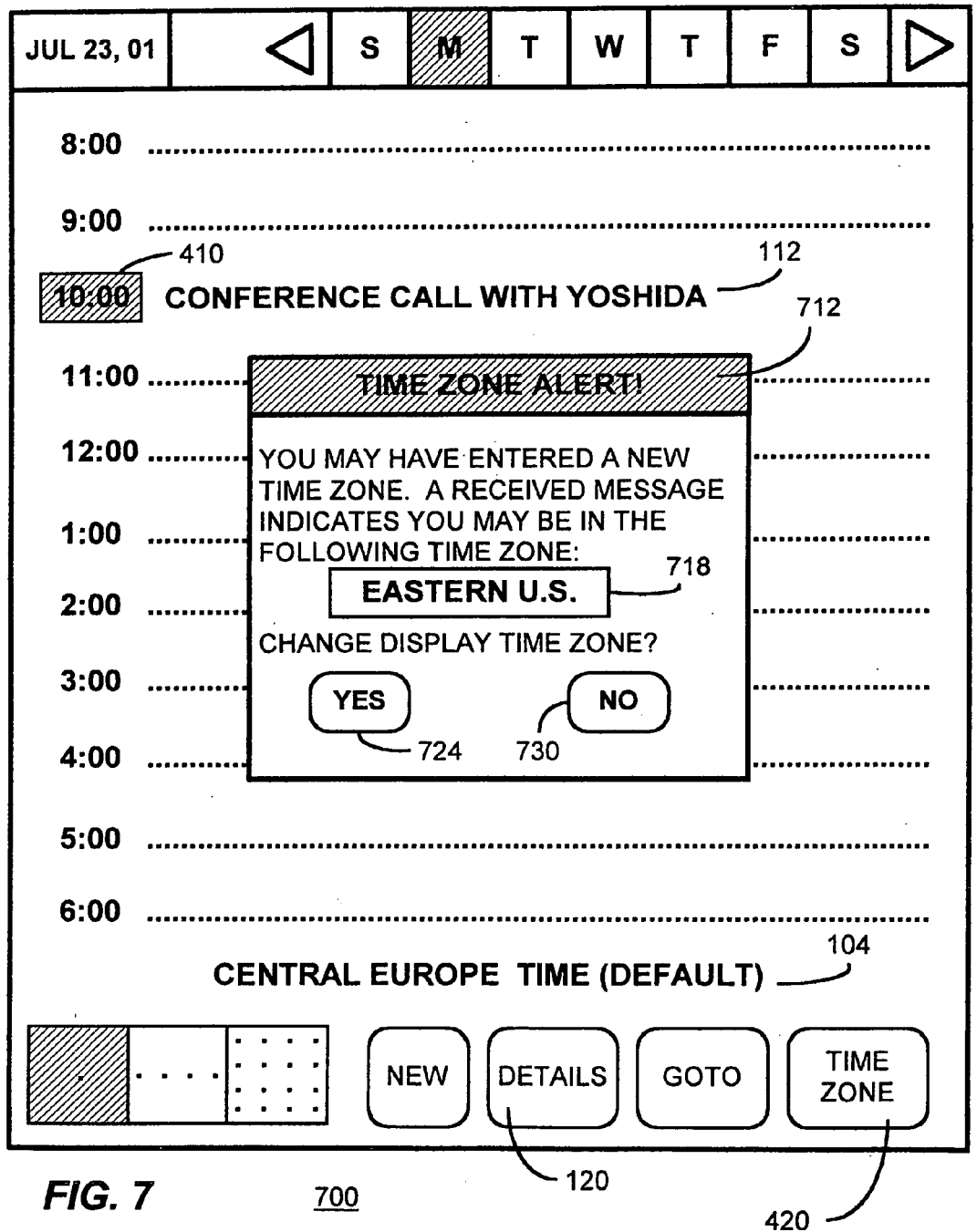
FIG. 7 is an exemplary display showing a time zone change alert consistent with an embodiment of the present invention.

In the event the current palmtop computer is able to receive indications of a time zone change (e.g., from a wireless service provider, a network or other communication), the display time zone may be updated semi-automatically in accordance with an embodiment of the present invention illustrated in connection with display 700 of FIG. 7. In this case, the palmtop computer receives an indication that a time zone change has occurred and the user is prompted by a simple window 712 appearing on the display that the time zone may have changed. When it is detected that a time zone may have changed, the system tries to determine the new local time zone and display it as a part of the alert. In this illustrative example, the window 712 indicates that the new time zone may be Eastern U.S. as indicated by box 718. The user is offered the opportunity to accept the new time zone as the display time zone. The user can then either accept the offer by selecting button 724 or reject it by selecting button 730. If the displayed time zone is incorrect, the user can simply tap the displayed time zone in box 718 to make a selection of a correct local time zone. This permits the user to display any selected display time zone, even if it is one outside the time zone that the user is currently in.

Figure 8:
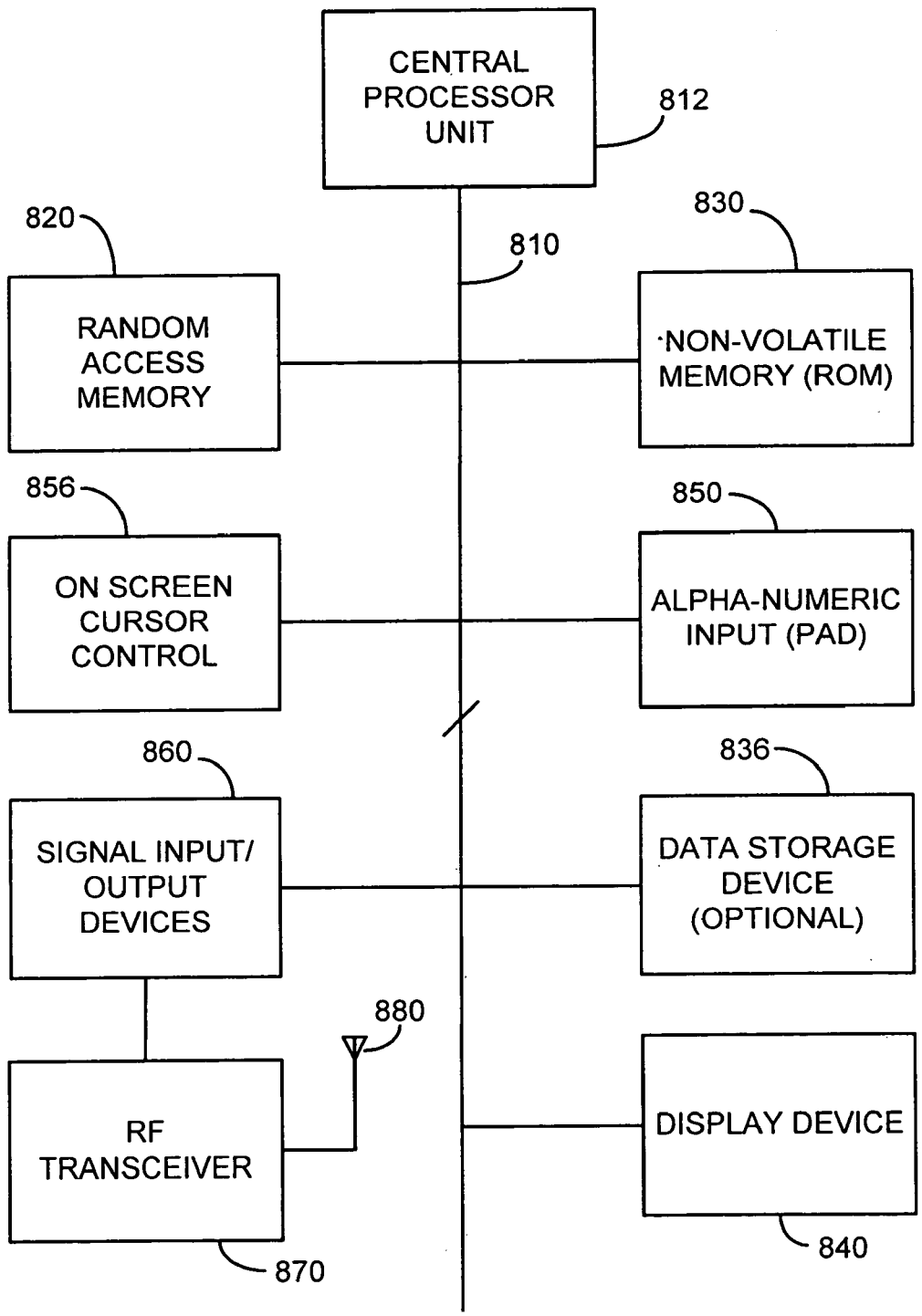
FIG. 8 is a block diagram of a computer system suitable for hosting an application consistent with embodiments of the present invention.

The current invention may be implemented as a computer program running on a palmtop computer or other computer system. One exemplary palmtop computer system is illustrated in FIG. 8. FIG. 8 illustrates circuitry of computer system 800 which includes an address/data bus 810 for communicating information, a central processor 812 coupled with the bus for processing information and instructions, a volatile memory 820 (e.g., random access memory RAM) coupled with the bus 810 for storing information and instructions for the central processor 812, and a non-volatile memory 830 (e.g., read only memory ROM) coupled with the bus 810 for storing static information and instructions for the processor 812. Computer system 800 also includes an optional data storage device 836 (e.g., memory stick, SD memory, etc.) coupled with the bus 810 for storing information and instructions. Device 836 can be removable. As described above, system 800 also contains a display device 840 coupled to the bus 810 for displaying information to the computer user.

Also included in exemplary computer system 800 is an alphanumeric input device 850 which in one implementation is a handwriting recognition pad ("digitizer") having regions forming part of a touch sensitive display for data entry. Device 800 can communicate information and command selections to the central processor 812. System 800 also includes an optional cursor control or directing device 856 coupled to the bus for communicating user input information and command selections to the central processor 812. In one implementation, device 856 is a touch screen device incorporated with the display. Device 856 is capable of registering a position on the display screen where the stylus makes contact. The display device utilized with the computer system 800 may be a liquid crystal device, cathode ray tube (CRT), field emission device (FED, also called flat panel CRT) or other display device suitable for creating graphic images and alphanumeric characters recognizable to the user. In one embodiment, the display is a flat panel display.

Signal communication device 860, also coupled to bus 810, can be a serial port for communicating with the palmtop computer's cradle. Device 860 can also include an infrared communication port and an interface to a radio frequency transmitter/receiver (transceiver) 870 to permit wireless communication using antenna 880.

The various operations described heretofore can be implemented as computer controlled processes stored as program instructions that are carried out on programmed central processor 812. The operations described above can be broadly described by the processes shown in FIGS. 9–11 below.

With reference to FIG. 9, an exemplary process for a user associating a time zone with an event is broadly depicted as process 900 starting at 910. At 920, the user enters an event in the appropriate location on the time grid and then selects a time zone at 930. In one embodiment, this is done by selecting a details button to call up a time zone selection, and then selecting the time zone from a time zone menu. Once the time zone is selected, it is associated with the entry and the event is displayed in the currently selected display time zone at 940. The process ends at 950.

With reference to FIG. 10, an exemplary process for a user changing the display time zone is broadly depicted as process 1000 starting at 1010. At 1020, the user selects a time zone for the display time zone. This may be accomplished by selecting a time zone button from the user interface to produce a time zone menu or using any other suitable user interface mechanism. At 1030, all events to be displayed are translated to the display time zone. At 1040, the translated events are displayed in the current time zone. The process ends at 1050.

With reference to FIG. 11, an exemplary process for semi-automatically changing a display time zone is depicted as process 1100 starting at 1110. At 1120 if no time zone information has been received, the process waits. If time zone information is received at 1120 and the time zone is new (i.e., different from the current time zone) at 1125, the user is prompted to confirm a change to a new time zone at 1130. If the time zone is not new at 1125, no action is taken and the process returns to 1120 to await the next time zone information. If the user chooses not to confirm the change at 1130, control again returns to 1120. If the user confirms the change, the display time zone is changed at 1150 and then control returns to 1120. Many variations of this process are possible including omitting the confirmation by the user in the event the time zone information is considered reliable. However, it is preferable that there be a confirmation process since this permits the user to select any desired time zone for any desired purpose.

Elements of the various user interfaces not explicitly discussed herein operate in a manner similar to that of conventional elements as used in the Palm Operating System version 3.0.

With the invention described, the exemplary situations discussed previously are readily handled as follows:

1. You are in France and schedule an appointment for a phone call with someone in California. You both want to deal with the same time and time zone to create the appointment, but still see at what time this will translate in your own local time zone. In this case you simply decide on the common time zone and both parties use this time zone for the event and display time zones.

2. You are in France and schedule an appointment for a phone call with someone in California while you will be in Tokyo. You want to use the California time to set the appointment, and see it displayed in your local time, even if you have changed time zone since you set it. In this case you simply set the appointment using California time as the event time and set the display time for the current time zone you are in.

3. You are in France, and schedule a meeting with someone in California, but this meeting will take place in Tokyo. You both want to be able to use Tokyo time. In this case, both parties can simply use Tokyo time for the event time. The time can be displayed using the display time as Tokyo time.

Many other scenarios present themselves and can be handled in a similar manner.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed: Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of management of time zone information in a calendar application running on a handheld computer, comprising:

storing an event, said event comprising a start time and an end time based on a first time zone;

establishing a display time zone wherein said display time zone is user customizable and independent of events associated with said calendar application;

translating the start time and the end time from said first time zone to the display time zone to produce a translated start time and end time; and displaying the event as occurring at the translated start time and end time, wherein:

the display time zone is established by receiving a message from a source external to said handheld computer indicating that a time zone change has occurred and an input from a user confirming said change in time zone, said message displayed to said user only when a second time zone received from said external source is different from said first time zone.

2. The method according to claim 1, wherein the event is displayed in a daily time grid.

3. The method according to claim 1, wherein the display time zone is established by a user selection through a user interface element.

4. The method according to claim 1, wherein the message is received from a network service provider.

5. The method according to claim 1, carried out in a handheld computer.

6. An electronic storage medium storing instructions which, when carried out on a programmed processor, carry out the method according to claim 1.

7. A handheld computer having time zone information management, comprising:

a programmed processor;

a display;

a calendar application running on the programmed processor to store an event associated with a duration of time in which said event is to take place for a first time zone, the calendar application further operating to:

store an event time zone attribute associated with the first time zone;

establish a display time zone by receiving a message from a source external to said handheld computer indicating that a time zone change has occurred and an input from a user confirming said change in time zone, said message displayed to said user only when a second time zone received from said external source is different from said first time zone;

store said display time zone wherein said display time zone is user customizable and independent of events associated with said calendar application; and translate the duration of time associated with the event from the stored time zone attribute to the display time zone to produce a translated duration of time; and wherein:

said display is for displaying the event as occurring at the translated block of time on the display.

8. The handheld computer according to claim 7, wherein the display displays the event in a daily time grid on the display.

9. The handheld computer according to claim 7, further comprising a user interface.

10. The handheld computer according to claim 9, wherein said calendar application is further operable to establish the display time zone by a user selection from a display time zone user interface element forming part of the user interface.

11. The handheld computer according to claim 10, wherein the display time zone user interface element forming part of the user interface comprises a display time zone menu.

12. The handheld computer according to claim 9, wherein said calendar application is further operable to establish the event time zone by a user selection from an event time zone user interface element forming part of the user interface.

13. The handheld computer according to claim 12, wherein the event time zone user interface element forming part of the user interface comprises a time zone menu.

14. The handheld computer according to claim 7, wherein the display time zone is associated with a first difference between the display time zone and Greenwich Mean Time;

and wherein the event time zone is associated with a second difference between the event time zone and Greenwich Mean Time;

and wherein the translating comprises finding a difference between the first difference and the second difference.

15. A handheld computer having time zone information management, compromising:

a programmed processor;

a display;

a user interface;

a calendar application running on the programmed processor to store an event associated with a duration of time in which said event is to take place for a first time zone, the calendar application further operating to:

store an event time zone attribute associated with the first time zone;

establish a display time zone by receiving a message from a source external to said handheld computer indicating that a time zone change has occurred, and receiving an input from a user confirming said change in time zone, said message displayed to said user only when a second time zone received from said external source is different from said first time zone;

store said display time zone wherein said display time zone is user customizable and is independent of events associated with said calendar application; and translate the duration of time associated with the event from the stored time zone attribute to the display time zone to produce a translated duration of time; and wherein said display is for displaying the event as occurring at the translated block of time on the display;

wherein the display time zone is established by a user selection from a display time zone user interface element forming part of the user interface; and wherein the event time zone is established by a user selection from an event time zone user interface element forming part of the user interface.

16. The handheld computer according to claim 15, wherein the event time zone user interface element forming part of the user interface comprises an event time zone menu.

17. The handheld computer according to claim 15, wherein the display time zone user interface element forming part of the user interface comprises a display time zone menu.

18. The handheld computer according to claim 15, wherein the display time zone is associated with a first difference between the display time zone and Greenwich Mean Time;

and wherein the event time zone is associated with a second difference between the event time zone and Greenwich Mean Time;

and wherein the translating comprises finding a difference between the first difference and the second difference.

* * * * *